Sept. 17, 1968 A. J. DAUGHERTY 3,401,594
PHOTOGRAPHIC PRINTING APPARATUS FOR MAKING PLURAL
ASSORTED-SIZED PRINTS SIMULTANEOUSLY
Filed Dec. 1, 1965 3 Sheets-Sheet 1

INVENTOR
ARTHUR J. DAUGHERTY
BY
Belker Kimmelman & Hagerman
ATTORNEYS.

Sept. 17, 1968   A. J. DAUGHERTY   3,401,594
PHOTOGRAPHIC PRINTING APPARATUS FOR MAKING PLURAL
ASSORTED-SIZED PRINTS SIMULTANEOUSLY
Filed Dec. 1, 1965   3 Sheets-Sheet 2
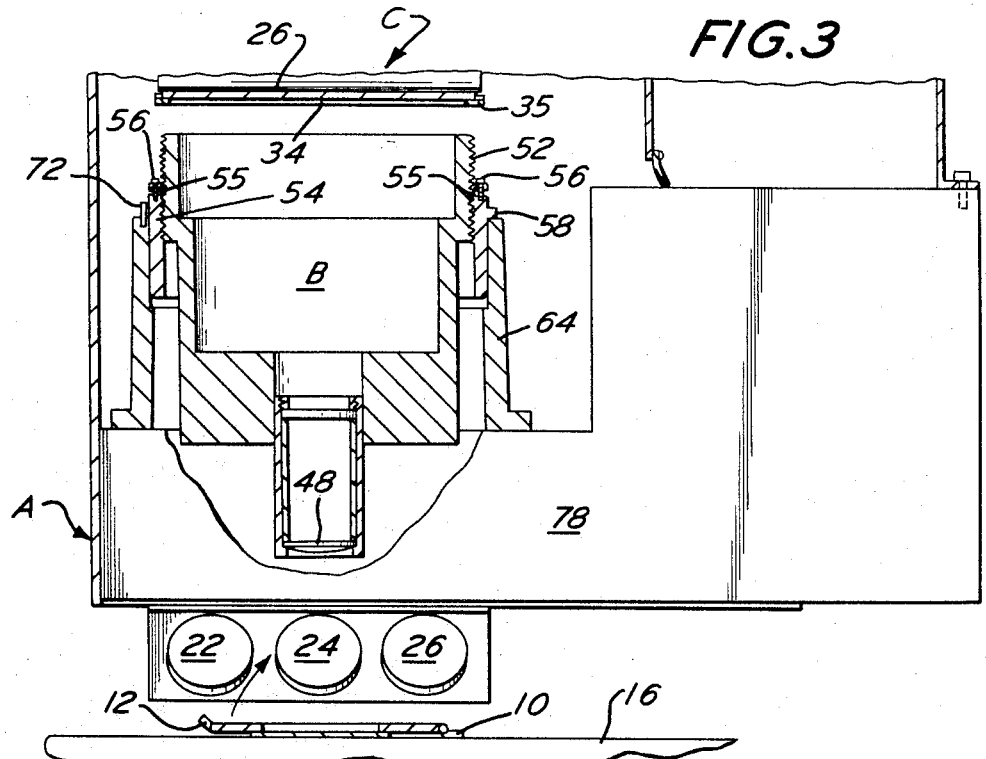
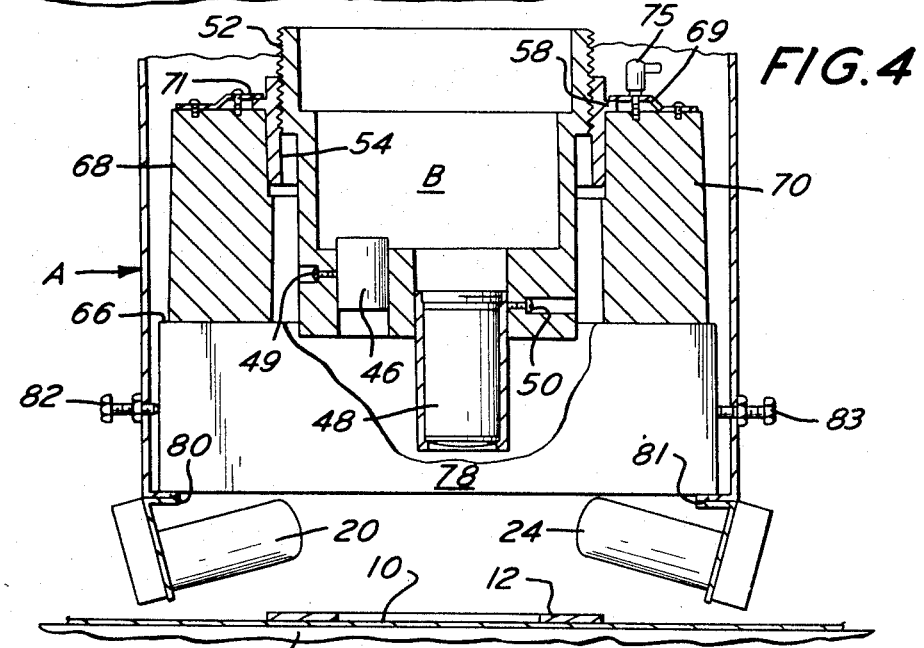
INVENTOR
ARTHUR J. DAUGHERTY
BY
ATTORNEYS.

Sept. 17, 1968      A. J. DAUGHERTY      3,401,594
PHOTOGRAPHIC PRINTING APPARATUS FOR MAKING PLURAL
ASSORTED-SIZED PRINTS SIMULTANEOUSLY
Filed Dec. 1, 1965      3 Sheets-Sheet 3
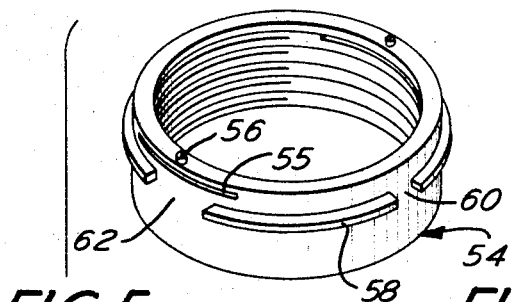
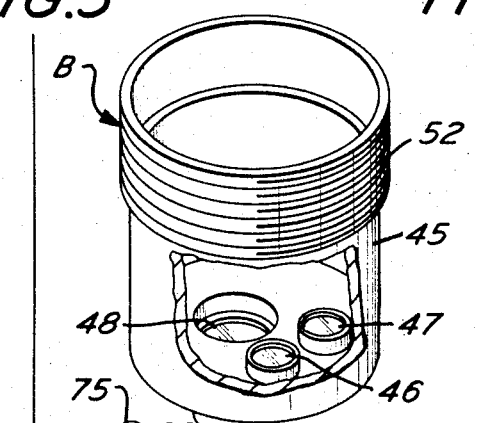
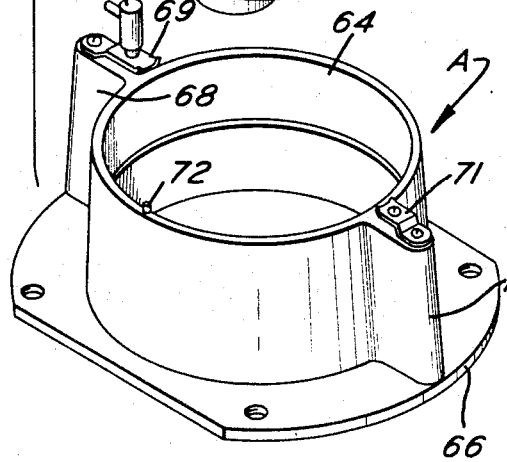
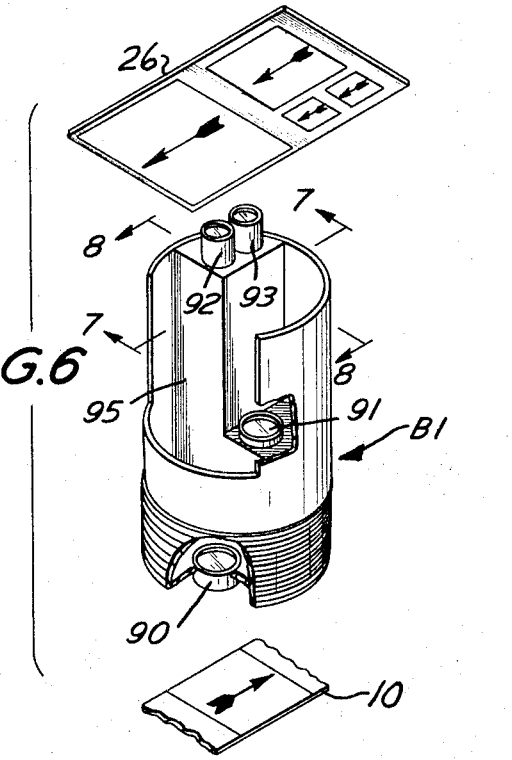
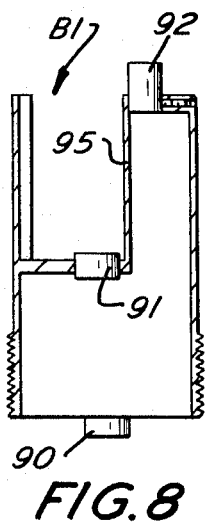
INVENTOR.
ARTHUR J. DAUGHERTY
BY
ATTORNEYS.

United States Patent Office

3,401,594
Patented Sept. 17, 1968

3,401,594
PHOTOGRAPHIC PRINTING APPARATUS FOR MAKING PLURAL ASSORTED-SIZED PRINTS SIMULTANEOUSLY
Arthur J. Daugherty, Philadelphia, Pa., assignor to Film Corporation of America, Philadelphia, Pa., a corporation of Delaware
Filed Dec. 1, 1965, Ser. No. 510,852
4 Claims. (Cl. 88—24)

ABSTRACT OF THE DISCLOSURE

Interchangeable lens cells for photographic printing apparatus to project plural assorted-sized prints simultaneously from single frames of various film sizes. Each cell includes a plurality of a first set of object lenses of a particular focal length mounted in a first plane and at least one objective lens of a second focal length mounted in a second plane parallel to and displaced from the first plane.

---

This invention relates to a photographic projection printing apparatus, and more particularly relates to a photographic apparatus for simultaneously printing a plurality of different sized prints from a single photographic negative, either colored or black and white.

In recent years, it has become increasingly popular, especially in commercial portraits of school children, to produce an assortment of sizes of prints for each child. A packaged arrangement might include a 4-inch by 6-inch enlargement or even an 8" x 10" as well as a plurality of smaller 2" x 2" prints, the latter often termed wallet-size. Thus, a suitable arrangement which has proven commercially feasible has been to offer one large and four wallet-sized portraits of each child whereby the larger picture could be kept in a frame at home or at Dad's office while a small print was given to each parent and the grandparents for convenient accessibility during the well-known cultural picture exchange program at our various social and quasi-social events.

Heretofore, the structure of the multi-vari-print program has been restricted to the school portraiture field, and the commercial operative technique employed consisted of making two separate print exposures from each negative frame, one an enlargement of the negative frame and then a series of small reductions of the same size of that frame at a second exposure interval. This operation required a two-step process on each frame including advancing the print paper from a roll, orienting the masks, and adjusting the exposure time as well as changing the optical or lens system itself for each print size desired. Switching lenses was and still is a time consuming operation even when accomplished by way of a rotatable turret system that is automatically driven.

The present invention is concerned with the area of amateur or lay photography and the production of multi-sized prints from each frame of a roll, colored or black and white, taken by the great mass of the public today. The market at which the instant invention is especially directed is that of the commercial developer who receives the roll of exposed film from the amateur photographer, either by mail or from the film store, and who returns the roll of negatives as well as prints of the individual frames after the processing has been completed. The market of the instant invention is addressed to an especially competitive field which must be highly automated and produce great efficiency of operation with minimum rejections.

It is therefore an object of this invention to provide a photographic projection printing apparatus which will simultaneously produce from each single frame of an exposed roll plural prints of various sizes without advancing the print paper.

Another object of this invention is to provide a photographic printing apparatus which will produce at the same time two 2" x 2" prints as well as a 4" x 4" enlargement of each frame of either a black-and-white or color film roll.

Still another object of this invention is to provide a photographic printing apparatus which will produce multiple prints of various sizes with maximum uniformity and efficiency.

Yet another object of this invention is to provide a multiple lens cell which is easily accommodated in existing photographic printing apparatus and is conveniently interchangeable with cells of other configurations.

A further object of this invention is to construct a multiple lens cluster which provides a plurality of sharply focused prints and without requiring switching or rotation.

A still further object of this invention is to provide a multi-copy vari-sized print apparatus of a versatility hitherto unattainable.

Other objects of this invention are to provide an improved device of the character described which is sturdy in construction, highly effective and efficient in operation, and easily and economically produced.

With the above and related objects in view, this invention consists of the details of construction and combination of parts as will be more fully understood from the following detailed description when read in conjunction with the accompanying drawing in which:

FIGURE 3 is a sectional view taken along lines 3—3 of FIGURE 2.

FIGURE 4 is a sectional view taken along lines 4—4 of FIGURE 2.

FIGURE 5 is an exploded perspective view of the cell of the multiple lens cluster.

FIGURE 6 is a perspective view of a modified form of the multiple lens cluster.

FIGURE 7 is a sectional view taken along lines 7—7 of FIGURE 6.

FIGURE 8 is a sectional view taken along lines 8—8 of FIGURE 6.

Figure 1:
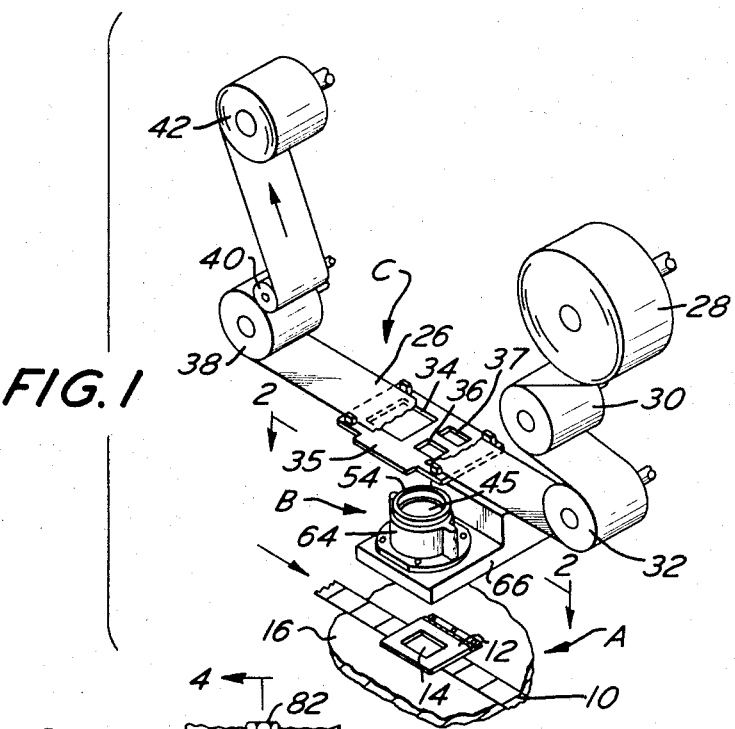
FIGURE 1 is an exploded perspective view of a projection printing apparatus having a multiple lens cluster embodying this invention.
Figure 2:
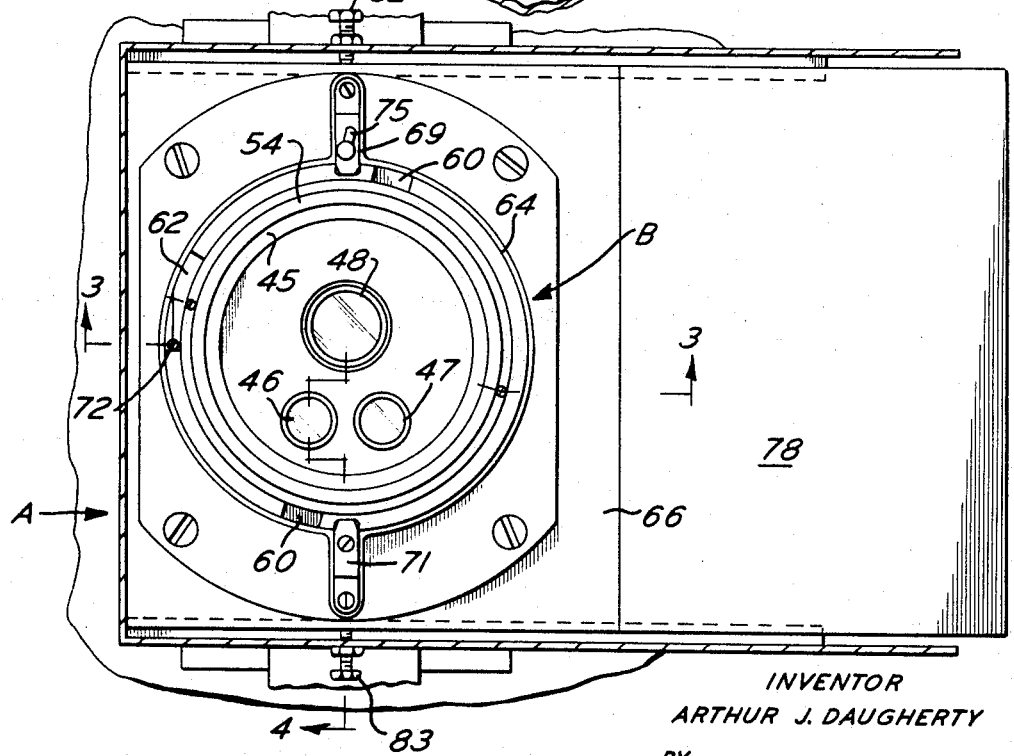
FIGURE 2 is a top plan view of the cell of the multiple lens cluster and taken along lines 2—2 of FIGURE 1.

Referring now in greater detail to the drawings in which similar reference characters refer to similar parts, I show a photographic printing apparatus, generally designated as A, comprising a multiple lens cell B which is mounted in the apparatus housing and simultaneously projects from a single frame on a film roll a plurality of vari-sized images upon a strip of photosensitive print paper fed into a carriage C at the upper portion of the housing.

The printing apparatus A itself is entirely conventional and may be the well-known Kodak Roll Paper Color Printer, Model IV–S, for example. Since the printing apparatus itself is commercially available, no great detail will be set forth herein to describe at length the mechanisms of such printing machine except to facilitate an understanding of the present invention. Thus, the conventional film printer includes the closed, generally lightproof housing A which contains a film transport assembly (not shown) for advancing film 10 so that one frame at a time is accurately positioned within a film mask holder 12. The holder 12 has a central aperture 14 which is of a rectangular size approximating the outline of the frames of the particular film size being printed, i.e., 127, 120, 116, etc. The margins of the holder 12 also hold the film 10 in flat disposition over platen 16 whereby the entire area of the frame being projected will lie in a plane. Lamp 18 in a chamber under the platen 16 illuminates the film frame from below by transmission through the film 10 while a plurality of filtered lamps 20, 22 and 24 are suspended over the masked frame and cast monochromatic red, blue and green light respectively from above. The lamps 20, 22 and 24 are used to accentuate and modify the various colors in the film 10 itself in order to reproduce correctly the true color upon the paper print strip stock 26. Suitable shutter means (not shown but located under the platen 16) is adapted to permit a beam of light to pass through the semitransparent film 10 for controlled intervals of time.

The carriage C advances the printing paper 26 from a paper feed roll 28 around idler roller 30 and reversing roller 32 to an exposing or printing position within guide mask 35. The exposed paper 26, which incidentally will have at least three images projected thereon simultaneously in each print zone (one enlargement 4" x 4" and two adjacent wallet size 2" x 2", for example), is then carried about reversing roller 38 and idler roller 40 to take-up roller 42 where it is loaded preparatory to development. It is to be observed that the guide mask 35 has one large rectangular aperture 34, nominally 4 inches wide and 4 inches long, and two smaller apertures 36 and 37, each nominally 2 inches by 2 inches, whereby a framed zone of approximately 4 inches by 6 inches is "imprinted" with each exposure on 4-inch wide paper roll stock. The carriage roll drive mechanism C is old in the art, and it is in the guide mask 35 and the multiple lens cell B that the instant invention resides.

The multiple lens cell B comprises a tubular retainer 45 which holds a pair of objective lens 46 and 47 for projecting an image approximately 2 inches square and an objective lens 48 for projecting an image approximately 4 inches square. It is to be noted that each of the objective lenses are composite multiple optic assemblies which are fitted within integrating rings that are held in precise position within the retainer 45 by set screws 49 and 50. The image to object distance (film-to-print paper spacing) is nominally 21 inches and the equivalent focal length of the objectives 46 and 47 for No. 127 film size is slightly greater than 5 inches and has a unity magnification whereas the objective lens 48 has an equivalent focal length approximately 4¼ inches with a 2.5 magnification. Of course, the projection of 2" x 2" images and one 4" x 4" image upon the print paper from a frame of No. 120 film would require a different equivalent focal length and magnification for each of the lenses 46, 47 and 48 if the entire cell were to be interchangeable for each size film or No. 116 film. However, in any event, particular attention is invited to the fact that multiple images of at least two sizes are being simultaneously projected by means of a single cluster of lenses, the lens 46, 47 and 48 being of different magnification or focal length and positioned in different planes.

The upper portion of the retainer 45 is shouldered and exteriorly threaded at 52. The threaded portion 52 is received within a complementary interiorly threaded adapter 54 which permits vertical adjustment of the entire cell cluster along a longitudinal axis as well as rotational positioning about this axis. The adapter 54 has a split collar portion 55 which can be distorted by set screws 56 so as to lock the retainer 45 in any threaded position. A peripheral flange 58 extends from the exterior of the adapter 54 and has diametrically-opposed keyways 60 and at a 90° interval therefrom a pair of relatively wide diametrically-opposed radial slots 62.

The adapter 54 with its lens cluster retainer 45 threaded therein is then mounted in cell bracket 64 which is secured to a medial shelf 66 within housing A. Wings 68 and 70 diametrically project from the bracket 64 and have respective spring clamps 69 and 71 secured to the upper portions thereof. First, the keyways 60 are slipped over the clamps 69 and 71 until the flanges 58 sit upon the upper edge of the bracket member 64. Rotating the adapter 54 causes the inboard edges of the spring clamps 69 and 71 to resiliently bear against the upper surface of flange 58. The degree of rotation of the cell cluster B is limited by pin 72 which upstands from the edge of bracket 64 and is received within radial slot 62. After the correct polar disposition of the cell B is effected, lock screw 75 is turned down to restrict further rotation of the lens cluster.

The area below the shelf 66 as shown in FIGURE 4 and at the right hand portion of FIGURE 3 is a casing 78 which encloses the conventional shutter assembly and the mechanism for automatically controlling the shutter operation for a prescribed period of time. The casing 78 is slidably received upon a pair of tracks 80 and 81 longitudinally extending within the main housing A. Adjusting screws 82 and 83 permit the casing 78 as well as the lens cell B to be laterally positioned within the housing whereby the images of the film frame 10 may be centered with respect to the print paper strip 26.

The mask 35 is specifically designed to form margins for the images projected by the lens cluster B. For example, the twin lenses 46 and 47 each project from a No. 126 size negative a 2" x 2" image within the corresponding apertures 36 and 37 and expose the clear area of the print stock 26. The lens 48 simultaneously projects a 4" x 4" image within aperture 34. It is to be observed that the objective lens 48 has a different focal length and is vertically displaced from the plane of the twin lenses 46 and 47.

It is also to be noted that various other lens clusters may be employed to project appropriate sized images from 35 mm. film or 120 film and the like. All of the lens clusters are designed to be fully interchangeable with the cell B. For example, in FIGURE 6, there is shown an alternative form of a modified lens cell B1 in which four separate lenses 90, 91, 92 and 93 are adapted to project four respective print images from a single frame of No. 120 film. That is, lens 90 projects one 3½" x 3½" image, lens 91 correspondingly projects a 2" x 2" image and the lenses 92 and 93 simultaneously project a pair of ¾" x ¾" images.

It is to be observed that the four lenses 90, 91, and the pair 92 and 93 are arranged in different planes by web 95 and at four different quadrants so that one lens does not interfere with the image projection of another. Also the various lenses are designed with different focal lengths although all are corrected for color. The total image frame is 3½ inches by 5¾ inches.

Although this invention has been described in considerable detail, such description is intended as being illustrative rather than limiting since the invention may be variously embodied and the scope of the invention is to be determined as claimed.

1. In a photographic printing apparatus, interchangeable lens cells for projecting a plurality of vari-sized images from single object frames of respective film sizes, each cell comprising a tubular member having an externally threaded end and including at least one apertured shelf disposed transverse to the axis of said tubular member, a plurality of first objective lenses of a first focal length mounted in said shelf in a nominal first plane with respect thereto, means for adjustably positioning each of said first objective lenses normal to said first plane to compensate for slight variations in focal length therebetween, at least one second objective lens of a second focal length differing from the first mounted in said tubular member in a second plane parallel to and longitudinally displaced from the first plane, means for adjustably positioning said second objective lens in said tubular member normal to the second plane to orient said second objective lens with respect to said first objective lenses, partition webs integrally formed within said tubular member and longitudinally compartmentalizing objective lenses of different focal lengths from each other in order to isolate spurious reflections from different levels, a tubular adapter having internal threads threadedly receiving the externally threaded end of said tubular member, means on said adapter to lock said tubular member axially with respect thereto, a cell bracket of substantially cylindrical configuration having an opening therein slightly greater than the diameter of said adapter, flange means on said adapter seatedly engaging the upper edge of said cell bracket, means for orienting said adapter about a polar axis in said bracket, and means to lock said adapter in said bracket after polar orinetation and focussing of the image plane with respect to the object plane has been completed.

2. The apparatus of claim 1 wherein the means to lock the tubular member axially with respect to said adapter comprises a split collar portion on said adapter, and a set screw for distorting the threads of said adapter with respect to the threads of said tubular member.

3. The apparatus of claim 1 wherein the flange means on said adapter includes circumferentially spaced segments with diametrtically opposed radial slots.

4. The apparatus of claim 3 wherein the means to lock said adapter in said bracket comprises diametrically opposed spring clamps on said bracket received through said radial slots and after rotation of said adapter bearing upon the flange segments thereof, and a screw extending through one of said spring clamps for selectively maintaining the polar orientation in locked disposition.

References Cited
UNITED STATES PATENTS 2,557,685    6/1951    Rabinowitz et al. _____ 88—24
3,212,396   10/1965    Schwardt et al. _____ 88—24

NORTON ANSHER, *Primary Examiner.*

W. A. SIVERTSON, *Assistant Examiner.*